March 1, 1960     H. F. ALBRECHT     2,926,577
SUPPLEMENTARY LENS STRUCTURE FOR TWIN LENS CAMERAS
Filed May 20, 1955
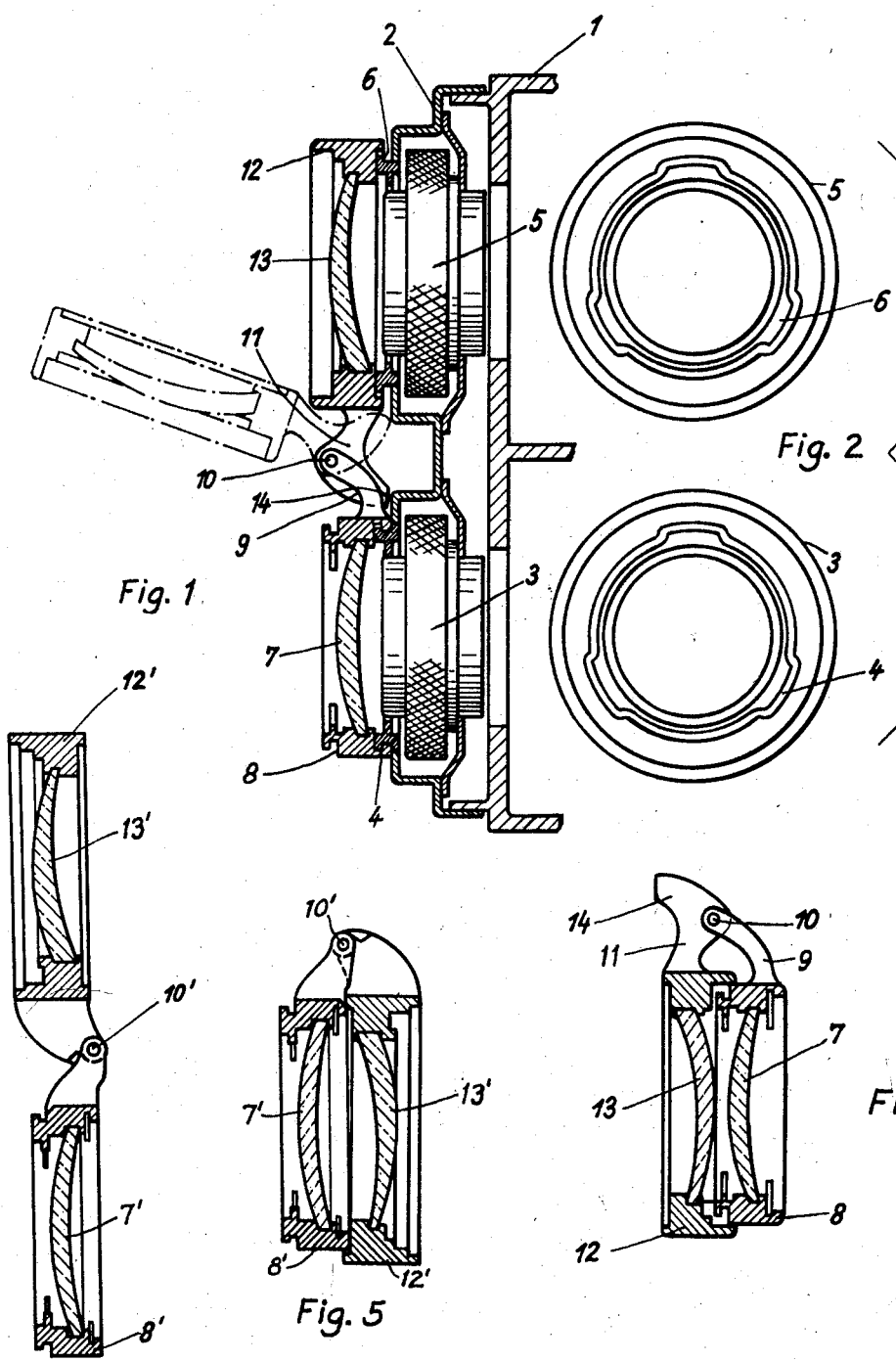

United States Patent Office 2,926,577
Patented Mar. 1, 1960

2,926,577

SUPPLEMENTARY LENS STRUCTURE FOR TWIN LENS CAMERAS

Hermann Friedrich Albrecht, Braunschweig, Germany, assignor to Franke & Heidecke, Fabrik Photographischer Präzisions-Apparate, a firm, Braunschweig, Germany Application May 20, 1955, Serial No. 510,008
In Germany September 9, 1949

Public Law 619, August 23, 1954
Patent expires September 9, 1969

8 Claims. (Cl. 95—44)

This invention relates to twin lens photographic cameras of the kind in which the taking and view finder lenses are interconnected so as to be simultaneously and correspondingly adjustable during focusing and in which provision is made for the attachment of supplementary lenses in front of the camera lenses.

When supplementary lenses are attached to such cameras, the taking and finder lenses have to be provided at the same time with identical supplementary lenses, while the finder supplementary lens must be additionally equipped with a parallax compensator wedge corresponding to close range focusing. The lens mounts can be constructed in such a manner that the optical wedge is combined with one of the supplementary lenses, this combination being attachable to the camera finder lens. With such an arrangement it is possible to exchange the individual lens mounts and to put them on the holding devices of the taking and finder lenses in any required combination. In this way it is possible, for instance, to combine two identical supplementary lenses and to use them together either on the taking lens or on the finder lens in order to extend the range of focusing. This introduces the danger of assembling the wrong combination on the taking or finder lens. Such mistakes could be eliminated by differently designing the respective holding devices of the lenses. However, by doing so, it would be impossible to use single, expensive supplementary members, for example tele-lenses, alternately on the taking lens and on the finder lens.

An object of the invention is the provision of generally improved and more satisfactory supplementary lenses for twin lens cameras.

Another object is the provision of supplementary lenses so designed and constructed that the supplementary lens designed for use with the finder lens of the camera, and embodying preferably a parallax-correcting wedge, can be applied only to the finder lens and not to the picture taking lens, this being accomplished, however, without impairing the ability to place the picture taking supplementary lens or other types of supplementary lenses (e.g., telephoto lenses or wide angle lenses) on either the picture taking lens of the camera or the finder lens of the camera, at will.

Still another object is the provision of simple and inexpensive means for retaining in front of one or both lenses of a twin lens camera, one or both lenses of a pair of dissimilar supplementary lenses, in proper matched relationship to the camera lenses.

These and other desirable objects may be attained in the manner disclosed as an illustrative embodiment of the invention in the following description and in the accompanying drawings forming a part hereof, in which:

Fig. 1 is a cross sectional view through the front part of a twin lens camera with supplementary lenses attached thereto;

Fig. 2 is a front view of the respective lens mounts;

Fig. 3 is a cross sectional view showing the supplementary lenses folded together;

Fig. 4 is a cross sectional view showing another embodiment; and

Fig. 5 is a cross sectional view showing the embodiment of Fig. 4 in the folded condition.

The same reference numerals throughout the several views indicate the same parts.

Fig. 1 shows only the front part of a camera of the twin lens type, preferably a twin lens reflex camera such as a "Rolleiflex" camera or a "Rolleicord" camera, both of these cameras being manufactured by the firm of Franke & Heidecke in Braunschweig, Germany, and being widely used and well known in the United States and elsewhere. The front plate 2 carrying the two lenses is axially movable on the camera body 1 for focusing. The taking lens 3 is equipped with bayonet catches 4, and correspondingly the finder lens 5 with bayonet catches 6. The supplementary lens 7 is fitted in a mount 8 which has complementary sockets by which it can be attached in known manner to the bayonet catches 4 of the taking lens 3. On the mount 8 there is a projecting arm 9 carrying a pivot 10, and on said pivot 10 is a freely movable arm 11 which is fixed to the mount 12 of a supplementary lens 13 for the finder lens 5. Said mount 12 has no bayonet catches but only a collar which rests on the mount of the lens 5. The supplementary lens 13 for the finder lens forms the combination of a meniscus with a wedge surface so that, in addition to having the effect of a supplementary lens, it causes a deflection of the rays corresponding to the mean parallax-compensation of its focusing range. The arm 11 may, as shown, be extended to provide a projection 14 which, when the supplementary lenses are fitted to the camera, is located adjacent the taking lens mount (or may be adjacent the front plate of the camera) thereby preventing the mount 12 from swinging downwards out of the axis of the finder lens 5 while, however, permitting sufficient movement of said mount away from the finder lens to enable the mount 8 to be rotated during its attachment to and detachment from the taking lens 3.

When the supplementary lenses have been fitted to the camera as shown in Fig. 1, both lenses 3 and 5 are brought to the same close range focus and simultaneously herewith the necessary parallax compensation is automatically effected. As the mount 8 is provided with bayonet sockets it is also possible to attach said mount 8 to the lens 5 by means of the bayonet catches 6 of said lens. In this case, however, since the catches 6 of the lens 5 are disposed in the same angular positions as the catches 4 of lens 3, the mount 12 can only extend either upwardly from the lens 5 or downwardly in an angularly inclined direction to one side or the other of the lens 3. This gives a sufficient guarantee of correctly attaching the supplementary members.

Fig. 3 illustrates both mounts 8 and 12 in folded condition in which they are brought together to occupy a space equal to that which two separate supplementary lenses would occupy when not in use, the lens 13 being located in front of the lens 7. However, by the permanent combination of said two mounts through the pivot 10, the supplementary lenses and wedges are prevented from being incorrectly combined with the camera lenses.

Figs. 4 and 5 show another embodiment of permanently interconnected supplementary lenses in which the pivot 10' is so positioned that, in the folded condition, the supplementary finder lens 13' is located rearwardly of the supplementary taking lens 7', the bayonet sockets on the mount 8' thus being covered when the mounts 8', 12' are folded together, so that this combination can be attached to the camera only in unfolded condition. In this way it is prevented that the combination is put in folded condition (according to Fig. 5) on the taking or finder lens, and in this way another guarantee against incorrect operation is effected.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. In a twin lens camera, the combination with a picture taking lens and a finder lens, of a plurality of supplementary lens means including supplementary taking lens means for use with the taking lens of the camera and supplementary finder lens means having a parallax correcting wedge for use with the finder lens of the camera, hinge means coupling the supplementary taking lens means to the supplementary finder lens means for movement of at least a part of one such lens means relative to the other about the axis of said hinge means extending approximately at right angles to the optical axes of the lenses, and means for detachably coupling said supplementary lens means to said camera lenses, said last named coupling means being so formed that said wedge of said supplementary finder lens means may be coupled to said camera lenses in a position alined with said camera finder lens when the supplementary taking lens means is alined with the camera taking lens but not in a position alined with said camera taking lens when the supplementary taking lens means is alined with the camera finder lens.

2. The combination with a picture taking lens mount and a finder lens mount for a twin lens camera, each lens mount including a plurality of bayonet mounting lugs, the lugs on one lens mount being substantial duplicates of those on the other lens mount but being oriented about the respective optical axes of the two lens mounts in such a way as to be non-symmetrical with respect to each other about a reference point located midway between said two optical axes, of a pair of supplementary lens mounts hingedly connected to each other, a supplementary taking lens in a first one of said supplementary mounts, a supplementary finder lens including a parallax correcting wedge in the second one of said supplementary mounts, and bayonet lug engaging means on said first supplementary mount, said lug engaging means being so formed that said first supplementary mount may be mounted on said taking lens mount of the camera in such position of orientation that said second supplementary mount is alined with the finder lens mount of the camera but may not be mounted on said finder lens mount of the camera except in a position of orientation in which said second supplementary mount is out of alinement with the taking lens mount of the camera.

3. A construction as defined in claim 2, in which said second supplementary mount has an arm adapted to bear against a part of the camera when said first supplementary mount is mounted on the taking lens mount of the camera, to limit the extent to which said second supplementary mount may swing relative to said first supplementary mount on the hinge connection between them so that said second supplementary mount may swing from a position in front of said finder lens toward but not completely to a position in front of said taking lens.

4. A twin lens camera accessory for a camera having a finder lens and a picture taking lens and a bayonet lug ring surrounding each lens, said accessory comprising a first lens mount having a supplementary taking lens therein, a second lens mount having a supplementary finder lens therein, said finder lens including a parallax correcting wedge, and hinge connecting means interconnecting the two mounts to each other, said hinge means being so formed that said two mounts may be folded over each other in overlapping relation and may be opened up to a position in which the two mounts lie approximately in a common plane and laterally offset from each other, only one of said lens mounts being provided near one face with bayonet lugs for interengaging with the lugs on the ring surrounding either lens of the camera, said lugs being so oriented with respect to said one of said lens mounts that when said lugs are operatively engaged with the bayonet lug ring of the camera lens for which it is intended, the other one of said lens mounts may occupy a position in front of the other one of the camera lenses, and when said lugs are operatively engaged with the bayonet lug ring of the other camera lens for which it is not intended, the other one of said lens mounts must be materially out of line with both of said camera lenses.

5. A construction as defined in claim 4, in which said hinge means is so formed that when said two mounts are folded in overlapping relation to each other, said one face of one mount lies adjacent the other mount.

6. A construction as defined in claim 4, in which said hinge means is so formed that when said two mounts are folded in overlapping relation to each other, said one face of one mount lies remote from the other mount.

7. The combination with a twin lens reflex camera having a picture taking lens and a finder lens with respective optical axes arranged substantially parallel to and spaced from each other and having bayonet connection mounts of substantially identical size surrounding each of said optical axes, of a supplementary attachment detachably mountable on said camera and comprising a picture taking optical assembly and a finder optical assembly hinged to each other to swing relative to ecah other from a collapsed position overlying each other to an extended position in which the effective centers of said two assemblies are separated from each other by substantially the same distance as the separation of the optical axes of said taking lens and finder lens of the camera, and bayonet lugs on one of said two assemblies for engaging either one of the bayonet connection mounts surrounding either one of said optical axes of the camera, said bayonet connection mounts and said lugs being so oriented with respect to each other and with respect to the hinge between said two assemblies that when the assembly having the bayonet lugs is normally engaged with the bayonet connection mount surrounding a certain one of said camera axes, the other assembly may occupy a position optically alined with the other of said camera axes, but when the assembly having the bayonet lugs is engaged with the bayonet connection mount surrounding the other one of said camera axes, then the other assembly cannot be brought into optical alinement with said certain one of said camera axes.

8. The combination with a twin lens reflex camera having a picture taking lens and a finder lens with respective optical axes arranged substantially parallel to and spaced from each other and having bayonet connection mounts of substantially identical size surrounding each of said optical axes, of a supplementary attachment detachably mountable on said camera and comprising a picture taking optical assembly and a finder optical assembly hinged to each other to swing relative to each other from a collapsed position overlying each other to an extended position in which the effective centers of said two assemblies are separated from each other by substantially the same distance as the separation of the optical axes of said taking lens and finder lens of the camera, and bayonet lugs on said picture taking assembly for engaging either one of the bayonet connection mounts surrounding either one of said optical axes of the camera, said bayonet connection mounts and said lugs being so oriented with respect to each other and with respect to the hinge between said two assemblies that when the picture taking assembly is normally engaged with the mount surrounding the optical axis of the picture taking lens, the finder assembly may occupy a position optically alined with the optical axis of the finder lens, but when the picture taking assembly is engaged with the mount surrounding the optical axis of the finder lens, the finder assembly cannot be brought into optical alinement with the optical axis of the picture taking lens.

References Cited in the file of this patent

UNITED STATES PATENTS

| | | |
|---|---|---|
| 1,636,736 | Debrie | July 26, 1927 |
| 1,859,207 | Howell | May 17, 1932 |
| 1,884,169 | Owens | Oct. 25, 1932 |
| 2,124,297 | Herrmann | July 19, 1938 |
| 2,132,683 | Farmen | Oct. 11, 1938 |
| 2,184,018 | Ort | Dec. 19, 1939 |
| 2,482,571 | Arnold | Sept. 20, 1949 |
| 2,674,932 | Tydings et al. | Apr. 13, 1954 |

FOREIGN PATENTS

| | | |
|---|---|---|
| 379,653 | France | Sept. 13, 1907 |
| 600,742 | Germany | Aug. 4, 1934 |